United States Patent
Kim et al.

(10) Patent No.: US 11,237,006 B2
(45) Date of Patent: Feb. 1, 2022

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Yeonseo Kim, Miyoshi (JP); Shin Sakurada, Toyota (JP); Daisuke Tanabe, Nagoya (JP); Ayana Takeshita, Toyota (JP); Hiroyuki Tokita, Toyota (JP); Koichi Asamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 16/435,848

(22) Filed: Jun. 10, 2019

(65) Prior Publication Data
US 2019/0390968 A1 Dec. 26, 2019

(30) Foreign Application Priority Data

Jun. 21, 2018 (JP) .............................. JP2018-117549

(51) Int. Cl.
*G01C 21/34* (2006.01)
*G08G 1/00* (2006.01)

(52) U.S. Cl.
CPC ....... *G01C 21/343* (2013.01); *G01C 21/3461* (2013.01); *G08G 1/202* (2013.01); *G08G 1/207* (2013.01)

(58) Field of Classification Search
CPC ...... G08G 1/202; G08G 1/207; G01C 21/343; G01C 21/3438; G01C 21/3461

USPC ........................................................ 701/411
See application file for complete search history.

(56) References Cited

U.S. PATENT DOCUMENTS

| | | | |
|---|---|---|---|
| 2008/0270019 A1* | 10/2008 | Anderson | G06Q 10/06 701/533 |
| 2012/0290652 A1* | 11/2012 | Boskovic | G06Q 50/30 709/204 |
| 2015/0254581 A1* | 9/2015 | Brahme | G06F 16/29 705/5 |
| 2016/0048777 A1* | 2/2016 | Kitagawa | G06Q 10/025 705/6 |

(Continued)

FOREIGN PATENT DOCUMENTS

| | | | |
|---|---|---|---|
| CA | 3087506 A1 * | 8/2019 | ....... G08G 1/096758 |
| DE | 102016107713 A1 * | 11/2016 | ......... G01C 21/3438 |

(Continued)

*Primary Examiner* — Atul Trivedi
(74) *Attorney, Agent, or Firm* — Oliff PLC

(57) ABSTRACT

An information processing apparatus according to this disclosure is an information processing apparatus applied to a traffic mode where a plurality of users including a first user and a second user ride in an identical vehicle and travel, and the second user gets off the identical vehicle earlier than the first user does, including a controller configured to execute: acquiring destination points of the first user and the second user; and setting a combination between the first user and the second user allowed to ride in the identical vehicle so that the destination point of the second user does not belong to a destination area that is a predetermined area including the destination point of the first user.

13 Claims, 19 Drawing Sheets

(56) References Cited

U.S. PATENT DOCUMENTS

| | | | |
|---|---|---|---|
| 2016/0086391 A1* | 3/2016 | Ricci | G06Q 10/10 |
| | | | 701/29.3 |
| 2016/0117610 A1* | 4/2016 | Ikeda | G06Q 10/02 |
| | | | 705/5 |
| 2016/0320194 A1* | 11/2016 | Liu | G01C 21/3423 |
| 2016/0320195 A1* | 11/2016 | Liu | G06Q 50/01 |
| 2016/0321566 A1* | 11/2016 | Liu | G01C 21/3438 |
| 2016/0334232 A1* | 11/2016 | Zhuang | G01C 21/3438 |
| 2017/0279957 A1* | 9/2017 | Abramson et al. | G06F 21/36 |
| 2017/0293950 A1* | 10/2017 | Rathod | G06Q 30/0639 |
| 2017/0365030 A1* | 12/2017 | Shoham | G06Q 10/02 |
| 2018/0211541 A1* | 7/2018 | Rakah | B60W 60/00253 |
| 2018/0341887 A1* | 11/2018 | Kislovskiy | G06Q 10/0635 |
| 2020/0168008 A1* | 5/2020 | Kuncl | G07C 5/0808 |
| 2020/0349666 A1* | 11/2020 | Hodge | G06F 21/36 |
| 2020/0393835 A1* | 12/2020 | Gregg | G01C 21/3438 |
| 2020/0410406 A1* | 12/2020 | Leary | G01C 21/20 |
| 2021/0072034 A1* | 3/2021 | Meroux | H04L 9/0643 |
| 2021/0082076 A1* | 3/2021 | Gulati | G06Q 50/30 |

FOREIGN PATENT DOCUMENTS

| | | | |
|---|---|---|---|
| JP | 2014-146261 A | 8/2014 | |
| WO | WO-2017068589 A1 * | 4/2017 | G01C 21/3626 |
| WO | WO-2017159419 A1 * | 9/2017 | G08G 1/123 |
| WO | WO-2017159557 A1 * | 9/2017 | G01C 21/3438 |
| WO | WO-2017202055 A1 * | 11/2017 | H04W 4/02 |
| WO | WO-2018194585 A1 * | 10/2018 | B60Q 3/20 |
| WO | WO-2019203806 A1 * | 10/2019 | G06Q 50/30 |
| WO | WO-2020263334 A1 * | 12/2020 | G05D 1/0246 |

* cited by examiner

Fig. 6

| USER ID (DRIVER) | VEHICLE NUMBER | DEPARTURE POINT | SCHEDULED DEPARTURE TIME | DESTINATION POINT |
|---|---|---|---|---|
| S001 | ... | c | 18:00 | e |
| S002 | ... | c | 18:00 | f |
| | | | | |

Fig. 7

| USER ID (PASSENGER) | DEPARTURE POINT | DESIRED DEPARTURE TIME | DESTINATION POINT | DESIRED ARRIVAL TIME |
|---|---|---|---|---|
| C001 | c | 18:00 | g | 18:20 |
| C002 | c | 18:00 | d | 18:30 |
| C003 | c | 18:00 | h | 18:20 |
| | | | | |

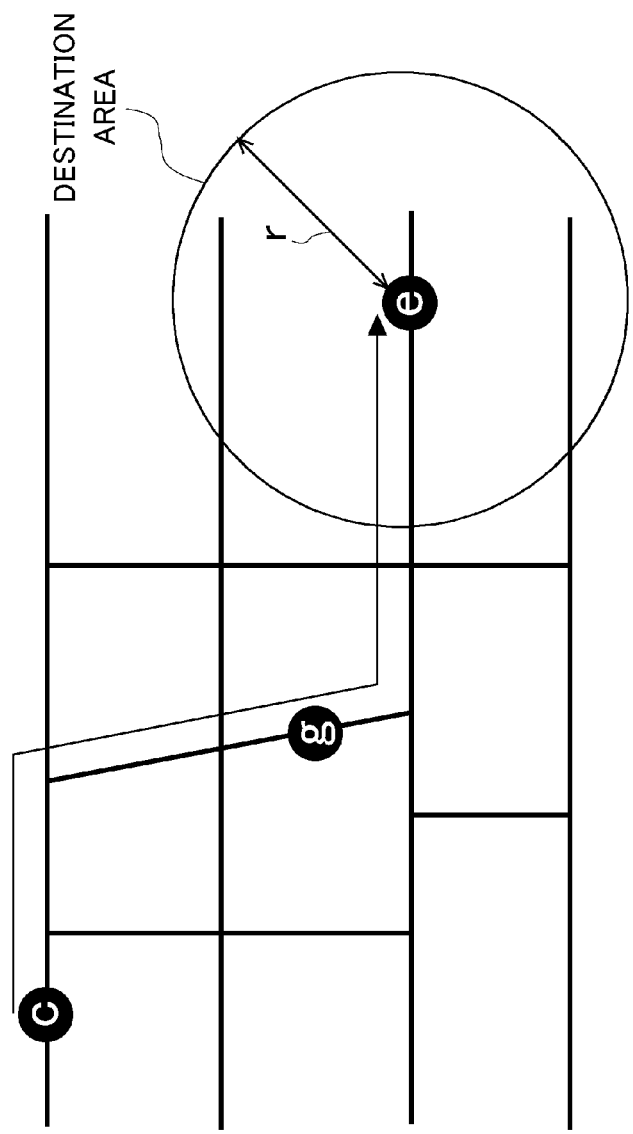

Fig. 9

| USER ID (DRIVER) | USER ID (PASSENGER) | VEHICLE NUMBER | DEPARTURE POINT | SCHEDULED DEPARTURE TIME | PASSENGER DESTINATION POINT | DRIVER DESTINATION POINT |
|---|---|---|---|---|---|---|
| S001 | C001 | ... | c | 18:00 | g | e |
| S002 | C002 | ... | c | 18:00 | d | f |
|  | C003 |  | c | 18:00 | h |  |
|  |  |  |  |  |  |  |

Fig. 13

| USER ID (DRIVER) | USER ID (PASSENGER) | VEHICLE NUMBER | DEPARTURE POINT | SCHEDULED DEPARTURE TIME | PASSENGER DESTINATION POINT | DRIVER DESTINATION POINT |
|---|---|---|---|---|---|---|
| S003 | C001 | ... | c | 18:00 | g | i |
|  | C002 |  | c | 18:00 | d |  |
|  |  |  |  |  |  |  |

INFORMATION PROCESSING APPARATUS AND INFORMATION PROCESSING METHOD

CROSS REFERENCE TO THE RELATED APPLICATION

This application claims the benefit of Japanese Patent Application No. 2018-117549, filed on Jun. 21, 2018, which is hereby incorporated by reference herein in its entirety.

BACKGROUND

Technical Field

The present disclosure relates to an information processing apparatus and an information processing method.

Description of the Related Art

Patent document 1 discloses a technique that calculates matching degrees between users using movement information and attribute information that correspond to each user, and retrieves a passenger on the basis of the matching degree, in a traffic mode where users ride with each other in a vehicle and travel.

CITATION LIST

Patent Document

[Patent document 1] Japanese Patent Laid-Open No. 2014-146261

SUMMARY

The present disclosure has an object to provide an information processing apparatus, an information processing method, and a program that can set a combination beneficial for users riding in an identical vehicle, in a traffic mode where the users ride in the identical vehicle and travel.

An information processing apparatus according to the present disclosure may be an information processing apparatus applied to a traffic mode where a plurality of users including a first user and a second user ride in an identical vehicle and travel, and the second user gets off the identical vehicle earlier than the first user does. The information processing apparatus may include a controller configured to execute: acquiring destination points of the first user and the second user in the traffic mode; and setting a combination between the first user and the second user allowed to ride in the identical vehicle so that the destination point of the second user does not belong to a destination area that is a predetermined area including the destination point of the first user.

An information processing apparatus according to the present disclosure may be an information processing apparatus applied to a traffic mode where a plurality of users including a first user and a second user ride in an identical vehicle and travel, and the second user boards the identical vehicle after the first user does. The information processing apparatus may include a controller configured to execute: acquiring departure points of the first user and the second user in the traffic mode; and setting a combination between the first user and the second user allowed to ride in the identical vehicle so that the departure point of the second user does not belong to a departure area that is a predetermined area including the departure point of the first user.

Furthermore, the present disclosure can be grasped from an aspect of an information processing method. For example, the present disclosure may be an information processing method applied to a traffic mode where a plurality of users including a first user and a second user ride in an identical vehicle and travel, and the second user gets off the identical vehicle earlier than the first user does, causing a computer to execute: a step of acquiring destination points of the first user and the second user in the traffic mode; and a step of setting a combination between the first user and the second user allowed to ride in the identical vehicle so that the destination point of the second user does not belong to a destination area that is a predetermined area including the destination point of the first user. The present disclosure may be a program for causing a computer to execute such an information processing method.

For example, the present disclosure may be an information processing method applied to a traffic mode where a plurality of users including a first user and a second user ride in an identical vehicle and travel, and the second user boards the identical vehicle after the first user does, causing a computer to execute: a step of acquiring departure points of the first user and the second user in the traffic mode; and a step of setting a combination between the first user and the second user allowed to ride in the identical vehicle so that the departure point of the second user does not belong to a departure area that is a predetermined area including the departure point of the first user. The present disclosure may be a non-transitory memory medium that stores a program for causing a computer to execute such an information processing method.

The present disclosure can set a combination beneficial for users riding in the identical vehicle, in a traffic mode where the users ride in the identical vehicle and travel.

BRIEF DESCRIPTION OF THE DRAWINGS

FIG. 6 depicts an example of a schedule information table;
FIG. 7 depicts an example of a request information table;
FIG. 8B is a first diagram for illustrating matching between a first user and a second user in a first embodiment;
FIG. 9 depicts an example of a matching information table according to the first embodiment.

FIG. 13 is a diagram exemplifying a matching information table according to the modification example 1 of the first embodiment;

DESCRIPTION OF THE EMBODIMENTS

Figure 1:
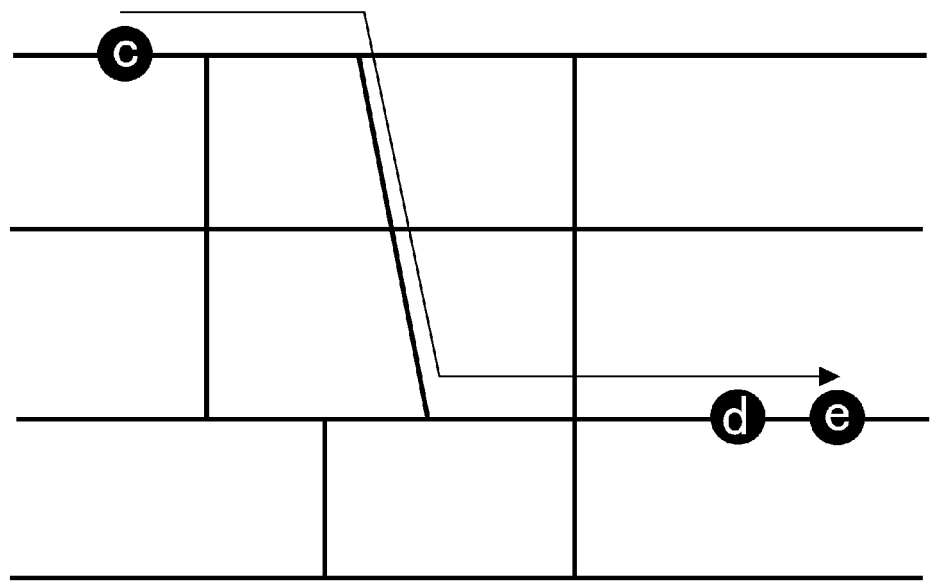
FIG. 1 is a first diagram for illustrating a rideshare.

An information processing apparatus according to the present disclosure may be applied to a traffic mode where people ride in the identical vehicle and travel. Here, the departure point and the destination point of a customer user using such a traffic mode (hereinafter, simply referred to as "user") are sometimes known to another user riding in the identical vehicle; the departure point is a boarding point where the user boards the vehicle, and the destination point is a descending position where the user gets off the vehicle.

For example, in a case where a first user and a second user ride in the identical vehicle and travel and the second user gets off the vehicle earlier than the first user does, the destination point of the second user is known to the first user. For example, if the second user boards the vehicle after the first user in the case where the first user and the second user ride in the identical vehicle and travel, the departure point of the second user is known to the first user.

Note that the first user and the second user are users who ride in the identical vehicle and travel. The second user gets off the vehicle earlier than the first user does, or the second user boards the vehicle after the first user does.

Here, the user uses the traffic mode with a predetermined purpose (commute, returning home, shopping, etc.). Consequently, the departure point and the destination point of each user tend to be included in the user's range of activity. The user has much information (e.g., detailed geographical information) about the area in his/her range of activity. Consequently, if the departure point or the destination point of the second user is included in the first user's range of activity associated with the departure point or the destination point of the first user riding in the identical vehicle, a situation can occur where the second user is afraid that his/her information (e.g., the zone of life) is known to the first user.

A controller of the information processing apparatus according to the present disclosure may set the combination between the first user and the second user allowed to ride in the identical vehicle so that the destination point of the second user does not belong to a destination area that is a predetermined area including the destination point of the first user. Alternatively, or besides such setting, this controller may set the combination between the first user and the second user to ride in the identical vehicle so that the departure point of the second user does not belong to a departure area that is a predetermined area including the departure point of the first user. Here, for example, the destination area may be an area having a distance that is from the destination point of the first user and is equal to or less than a predetermined distance. Alternatively, for example, the departure area may be an area having a distance that is from the departure point of the first user and is equal to or less than a predetermined distance. Note that such a destination area and departure area are defined so as to include the range of activity of the first user.

According to the combination of users set as described above, the destination point or the departure point of the second user is a point outside of the range of activity of the first user. Accordingly, it is difficult for the first user to grasp detailed information related to the destination point or the departure point of the second user. In other words, the second user is facilitated to protect his/her information. This can prevent the second user from hesitating to use the traffic mode described above as much as possible. The second user is facilitated to use the traffic mode described above. As described above, the information processing apparatus according to the present disclosure can set the combination beneficial for the users riding in the identical vehicle.

First Embodiment (Overview of Matching System)

FIG. 1 illustrates the traffic mode where multiple users ride in the identical vehicle and travel. In FIG. 1, a user A and a user B depart the identical departure point c (the point c is, for example, the place of work of the user A and the user B). The user A travels from the departure point c to the destination point e (the point e is, for example, the residence of the user A), and the user B travels from the departure point c to a destination point d (the point d is, for example, the residence of the user B).

Here, if the users A and B separately move to the destination points by each vehicle, two vehicles are to be used. On the contrary, if the users A and B ride in the identical vehicle and travel, movement to the destinations is allowed by one vehicle. In an example depicted in FIG. 1, the user A serves as a driver of the vehicle, and moves the vehicle from the point c to the point e. In this case, the user A allows the user B to ride in the vehicle at the departure point c, and allows the user B to get off the vehicle at the point d, thereby enabling the user B to move from the point c to the point d.

Figure 2:
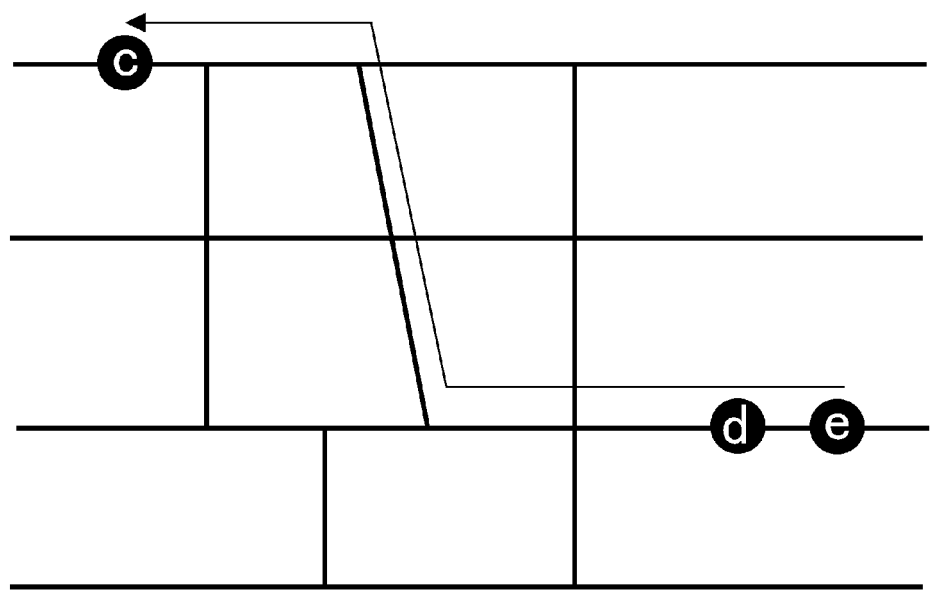
FIG. 2 is a second diagram for illustrating a rideshare.

As with FIG. 1, FIG. 2 also illustrates the traffic mode where people ride in the identical vehicle and travel. In the example depicted in FIG. 2, the user A serves as the driver of the vehicle, and moves the vehicle from the point e (the point e is, for example, the residence of the user A) to the point c (the point c is, for example, the place of work of the user A and the user B). In this case, the user A allows the user B to board the vehicle at the point d (the point d is, for example, the residence of the user B) and allows the user B to get off the vehicle at the point c.

Such traffic mode can reduce the number of vehicles traveling on roads, which can reduce traffic jams. Furthermore, for example, the transportation cost (including the fuel cost etc.) used for movement using a vehicle is shared and afforded (cost sharing) among the users of the vehicle, thereby allowing the transportation cost per user to be reduced in comparison with a case where the users separately move in different vehicles.

However, the information on the customer user using such a traffic mode (hereinafter, simply referred to as "user") is sometimes known to another user riding in the identical vehicle. For example, in a case where the point d is the residence of the user B in the examples depicted in FIGS. 1 and 2, the residence of the user B is known to the user A. Accordingly, a situation can occur where the user who does not wish that the information, such as his/her own residence and zone of life, is grasped in detail by another person hesitates to use the traffic mode.

In the matching system according to this embodiment, the server apparatus matches the first user with the second user. Note that the first user and the second user are users who ride in the identical vehicle and travel, and the second user gets off the vehicle earlier than the first user does. In detail, the server apparatus sets the combination between the first user and the second user allowed to ride in the identical vehicle so that the destination point of the second user does not belong to a destination area that is a predetermined area including the destination point of the first user. That is, the apparatus matches the first user with the second user.

(System Configuration)

Figure 3:
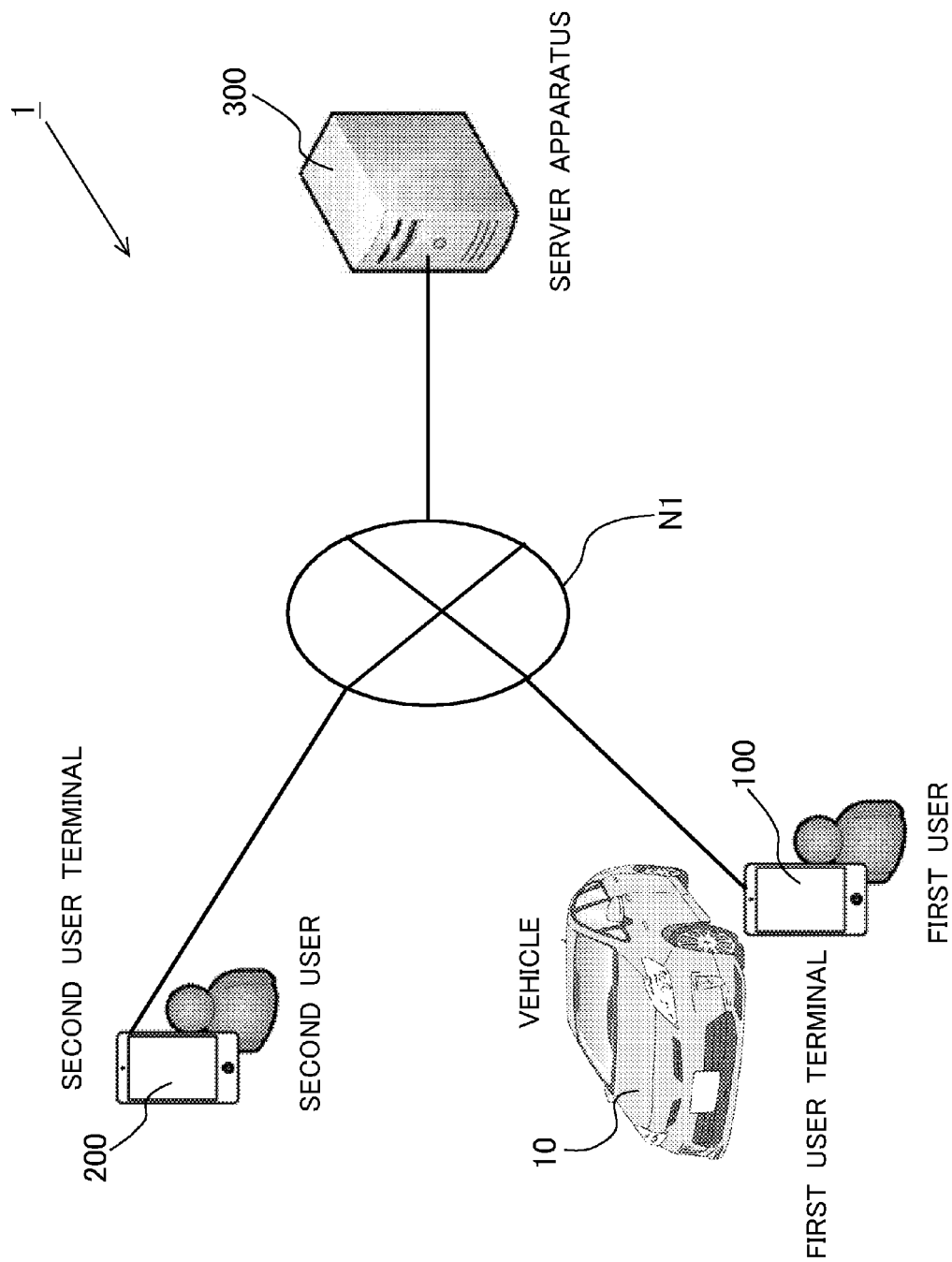
FIG. 3 is a diagram depicting the schematic configuration of a matching system according to a first embodiment.

FIG. 3 is a diagram depicting the schematic configuration of the matching system according to this embodiment. In the example in FIG. 3, the matching system 1 includes a vehicle 10, a first user terminal 100 that is a terminal owned by the first user who drives the vehicle 10, a second user terminal 200 that is a terminal owned by the second user riding in the vehicle 10 that the first user drives, and a server apparatus 300. The first user terminal 100, the second user terminal 200, and the server apparatus 300 are connected to each other by a network N1.

The server apparatus 300 accepts registration of the information from the user using the traffic mode depicted in FIG. 1 (hereinafter, such a traffic mode is sometimes referred to as "rideshare"). Identification information related to the user and information on the vehicle provided for rideshare are registered in the server apparatus 300. The user requesting a ride in any vehicle registered in the server apparatus 300 can register information indicating a request for a ride (hereinafter, request information) using the user terminal. The user driving the vehicle provided for the rideshare registered in the server apparatus 300 can register a traveling schedule (hereinafter, schedule information) of the vehicle, using the user terminal. Note that the user can register the information through an application installed in the user terminal for using a rideshare service (hereinafter, sometimes called "predetermined application"), for example. However, there is no intention of limitation to the mode of registering the information using the user terminal. The information may be registered using any terminal connectable to the network N1 (a smartphone, a mobile phone, a tablet terminal, a personal information terminal, a wearable computer or the like) or a personal computer (PC). The identification information related to the user, and the information on the vehicle provided for rideshare are preliminarily registered by the predetermined application.

The server apparatus 300 then matches the first user with the second user on the basis of the request information and the schedule information. In this case, the server apparatus 300 matches the first user with the second user so that the destination point of the second user does not belong to the destination area of the first user. FIG. 3 depicts the thus matched first user and the second user. That is, FIG. 3 depicts the first user and the second user matched with each other as described above by the server apparatus 300 on the basis of the schedule information registered by the first user using the first user terminal 100 and of the request information registered by the second user using the second user terminal 200. The details of the matching process are described later.

(Hardware Configurations)

Figure 4:
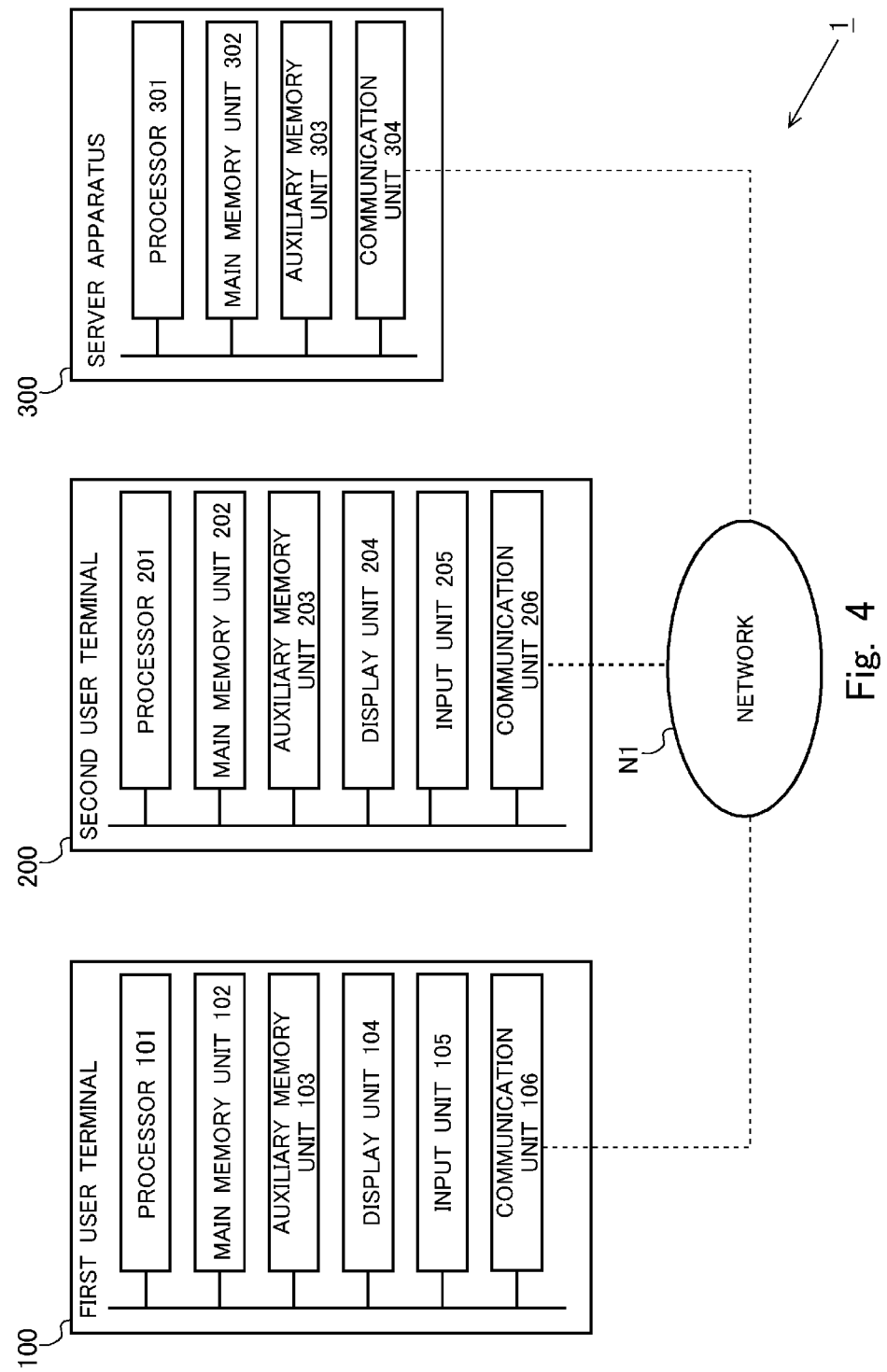
FIG. 4 is a diagram exemplifying each of hardware configurations of a first user terminal, a second user terminal, and a server apparatus in the matching system.

FIG. 4 is a diagram exemplifying each of hardware configurations of the first user terminal 100, the second user terminal 200, and the server apparatus 300.

First, the server apparatus 300 is described. The server apparatus 300 has the configuration of a typical computer. The server apparatus 300 includes a processor 301, a main memory unit 302, an auxiliary memory unit 303, and a communication unit 304. These are connected to each other by a bus. The main memory unit 302 and the auxiliary memory unit 303 are computer-readable recording media. The hardware configuration of the computer is not limited to the example depicted in FIG. 4. The components may be appropriately omitted, replaced and added.

The server apparatus 300 causes the processor 301 to load a program stored in the recording medium into a work area of the main memory unit 302 and execute the program, and to control each functional component and the like through execution of the program, thereby allowing a function satisfying a predetermined object to be achieved.

The processor 301 is, for example, a CPU (Central Processing Unit) or a DSP (Digital Signal Processor). The processor 301 controls the server apparatus 300 to perform the operation of various information processes. The main memory unit 302 includes, for example, a RAM (Random Access Memory) and a ROM (Read Only Memory). The auxiliary memory unit 303 is, for example, an EPROM (Erasable Programmable ROM), or a hard disk drive (HDD). The auxiliary memory unit 303 may include a removable medium, i.e., a removable recording medium. The removable medium is, for example, a disk recording medium, such as a USB (Universal Serial Bus) memory or a CD (Compact Disc) or a DVD (Digital Versatile Disc).

The auxiliary memory unit 303 stores various programs, various data items and various tables, in the recording medium, in a readable and writable manner. The auxiliary memory unit 303 stores an operating system (OS), various programs, various tables, etc. The information stored in the auxiliary memory unit 303 may be stored in the main memory unit 302. Furthermore, the information stored in the main memory unit 302 may be stored in the auxiliary memory unit 303.

The communication unit 304 is connected to another apparatus, and controls communication between the server apparatus 300 and the other apparatus. The communication unit 304 is, for example, a LAN (Local Area Network) interface board, or a wireless communication circuit for wireless communication. The LAN interface board or the wireless communication circuit is connected to the network N1, such as the Internet, which is a public communication network.

A series of processes executed by the server apparatus 300 can be executed by hardware, but can be executed by software instead.

Next, the second user terminal 200 is described. The second user terminal 200 is, for example, a small computer, such as a smartphone, a mobile phone, a tablet terminal, a personal information terminal, or a wearable computer (a smartwatch etc.). Note that the second user terminal 200 may be a personal computer (PC) that is connected to the server apparatus 300 via the network N1, such as the Internet, which is a public communication network.

The second user terminal 200 includes a processor 201, a main memory unit 202, an auxiliary memory unit 203, a display unit 204, an input unit 205, and a communication unit 206. The processor 201, the main memory unit 202, and the auxiliary memory unit 203 are analogous to the processor 301, the main memory unit 302, and the auxiliary memory unit 303 of the server apparatus 300. Accordingly, the description thereof is omitted. The display unit 204 is, for example, a liquid crystal display (LCD), an Electroluminescence (EL) panel or the like. The input unit 205 includes a touch panel, push buttons, etc. Furthermore, the input unit 205 may include a camera allowing videos and images to be input, or an audio input unit, such as a microphone. The communication unit 206 is, for example, a communication circuit for accessing the network N1 using a mobile communication service (a telephone communication network, such as of mobile phones, or wireless communication, such as WiFi) and for communicating with the server apparatus 300 and the like.

Next, the first user terminal 100 is described. As with the second user terminal 200, the first user terminal 100 includes a processor 101, a main memory unit 102, an auxiliary memory unit 103, a display unit 104, an input unit 105, and a communication unit 106. The processor 101, the main memory unit 102, the auxiliary memory unit 103, the display unit 104, the input unit 105, and the communication unit 106 are analogous respectively to the processor 201, the main memory unit 202, the auxiliary memory unit 203, the display unit 204, the input unit 205, and the communication unit 206 of the second user terminal 200. Accordingly, the description thereof is omitted.

The network N1 is, for example, a worldwide public communication network, such as the Internet. A WAN (Wide Area Network) or another communication network may be adopted. The network N1 may include a telephone communication network such as of mobile phones, and a wireless communication network such as WiFi.

(Functional Configuration of Server Apparatus)

Figure 5:
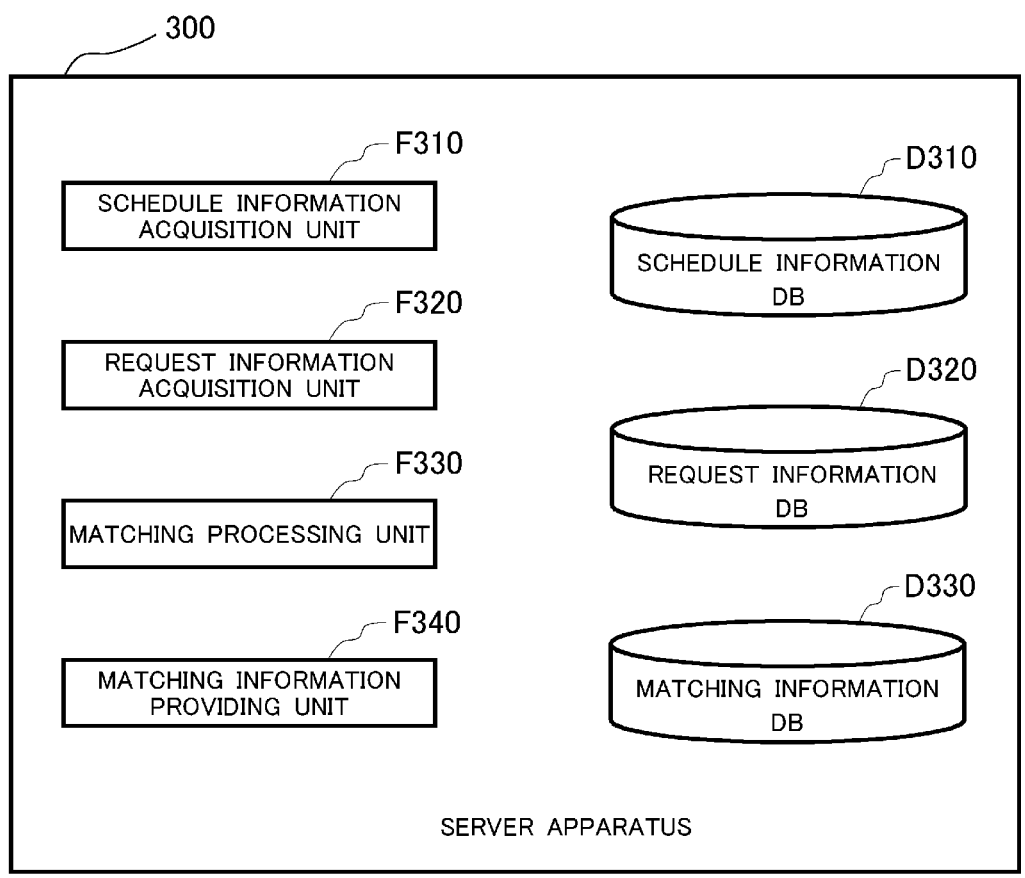
FIG. 5 is a diagram exemplifying a functional configuration of the server apparatus.

FIG. 5 is a diagram exemplifying a functional configuration of the server apparatus 300. The server apparatus 300 includes, as functional components: a schedule information acquisition unit F310; a request information acquisition unit F320; a matching processing unit F330; a matching information providing unit F340; a schedule information database D310; a request information database D320; and a matching information database D330. The processor 301 of the server apparatus 300 causes a computer program on the main memory unit 302 to execute the processes of the schedule information acquisition unit F310, the request information acquisition unit F320, the matching processing unit F330, and the matching information providing unit F340. Note that any of the functional components or a part of the process thereof may be executed by a hardware circuit.

The schedule information database D310, the request information database D320, and the matching information database D330 are constructed through management of data stored in the auxiliary memory unit 303, the management being performed by a program of a database management system (DBMS) executed by the processor 301. The schedule information database D310, the request information database D320, and the matching information database D330 are, for example, relational databases.

Note that any of the functional components of the server apparatus 300 or a part of the process thereof may be executed by another computer connected to the network N1. For example, the processes of the matching processing unit F330, and the processes of the schedule information acquisition unit F310, the request information acquisition unit F320 and the matching information providing unit F340 may be executed separately by different computers.

The schedule information acquisition unit F310 acquires the schedule information from the user driving the vehicle provided for rideshare. Note that the schedule information includes the departure point and the destination point of the vehicle used for rideshare, that is, the movement schedule of the user driving the vehicle. The schedule information acquisition unit F310 registers the schedule information in the schedule information database D310.

Here, the schedule information database D310 is a database that stores the schedule information. The schedule information database D310 includes a schedule information table depicted in FIG. 6. Note that information stored in the schedule information table is not limited to the example depicted in FIG. 6. A field can be appropriately added, changed or removed.

The schedule information table depicted in FIG. 6 includes the fields of the user ID (driver ID), vehicle number, departure point, scheduled departure time and destination point. The driver ID is the ID for identifying the driver, and is preliminarily associated with the identification information (vehicle number) on the vehicle in the server apparatus 300. Rideshare user information that includes the user ID is managed by an individual table. The table includes the user's contact destination and the like. The contact destination is, for example, the user's mobile phone number or email address.

In the example depicted in FIG. 6, a driver S001 causes the vehicle to depart the departure point c at 18:00, and moves the vehicle toward the destination point e (the destination point e is the residence of the driver S001.). A driver S002 causes the vehicle to depart the departure point c at 18:00, and moves the vehicle toward the destination point f (the destination point f is the residence of the driver S002.).

Here, returning to the description of FIG. 5. The request information acquisition unit F320 acquires the request information from the user requesting a ride in any vehicle registered in the server apparatus 300. Note that the request information includes the departure point and the destination point of the user requesting the ride. The request information acquisition unit F320 registers the request information in the request information database D320.

The request information database D320 is a database that stores the request information. The request information database D320 includes a request information table depicted in FIG. 7. Note that information stored in the request information table is not limited to the example depicted in FIG. 7. A field can be appropriately added, changed or removed.

The request information table depicted in FIG. 7 includes the fields of the user ID (passenger ID), departure point, desired departure time, destination point, scheduled arrival time. In the example depicted in FIG. 7, the passenger C001 desires to depart the departure point c at 18:00, and reach the destination point g at 18:20 (the destination point g is a predetermined point in a vicinity of the residence of the passenger C001). The passenger C002 desires to depart the departure point c at 18:00 and reach the destination point d at 18:30 (the destination point d is a predetermined point in a vicinity of the residence of the passenger C002). The passenger C003 desires to depart the departure point c at 18:00 and reach the destination point h at 18:20 (the destination point h is a predetermined point in a vicinity of the residence of the passenger C003).

Note that the user inputs the schedule information or the request information into the user terminal (e.g., the first user terminal 100 or the second user terminal 200), thereby transmitting the information from the user terminal to the server apparatus 300. In detail, the first user terminal 100 has a functional configuration of accepting input of the schedule information and transmitting the input information to the server apparatus 300. The processor 101 of the first user terminal 100 causes a computer program on the main memory unit 102 to execute a process of transmitting the schedule information input from the input unit 105, to the server apparatus 300 via the communication unit 106. The second user terminal 200 has a functional configuration of accepting input of the request information and transmitting the input information to the server apparatus 300. The processor 201 of the second user terminal 200 causes a computer program on the main memory unit 202 to execute a process of transmitting the request information input from the input unit 205, to the server apparatus 300 via the communication unit 206. The schedule information acquisition unit F310 and the request information acquisition unit F320 acquire the information transmitted from the user terminal.

Here, returning to the description of FIG. 5. The matching processing unit F330 matches the first user scheduled to drive the vehicle 10 with the second user scheduled to ride in the vehicle 10 driven by the first user. As described above, in this embodiment, the second user gets off the vehicle 10 earlier than the first user does. The matching process performed by the matching processing unit F330 is described on the basis of FIGS. 8A to 8C. Note that the processor 301 executes the processes of the schedule information acquisition unit F310, the request information acquisition unit F320, and the matching processing unit F330, thereby functioning as a control unit according to the present disclosure. The server apparatus 300 then functions as an information processing apparatus according to the present disclosure.

Figure 8A:
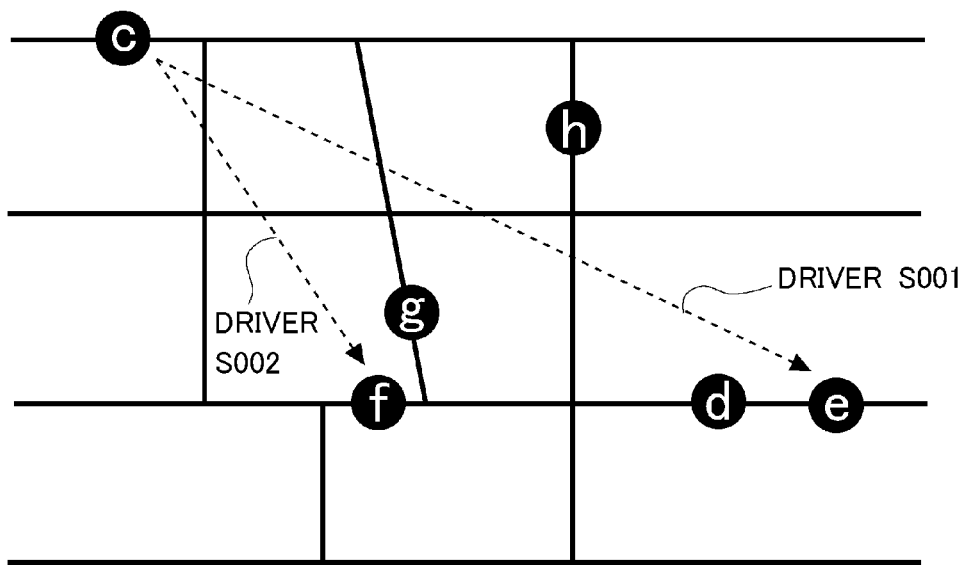
FIG. 8A exemplifies departure points and destination points of users (S001 and S002) depicted in FIG. 6 and users (C001, C002 and C003) depicted in FIG. 7.

FIG. 8A exemplifies the departure points and destination points of the users (S001 and S002) depicted in FIG. 6 and the users (C001, C002 and C003) depicted in FIG. 7. In this example, the matching processing unit F330 sets a second user allowed to ride in the vehicle 10 driven by the user S001, who is a first user, and sets a second user allowed to ride in the vehicle 10 driven by the user S002, who is a first user.

Figure 8C:
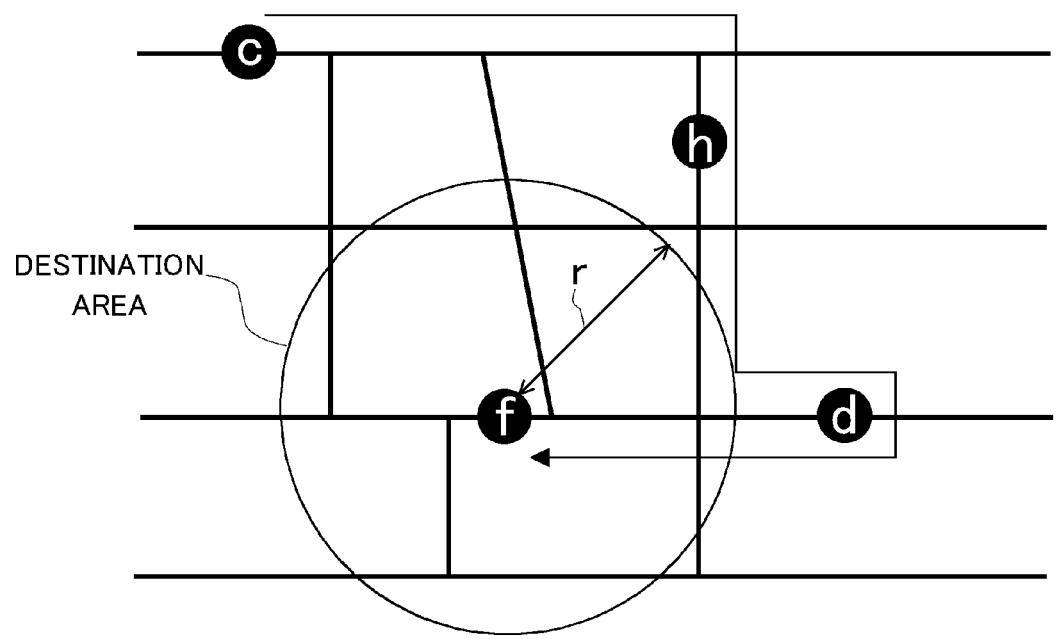
FIG. 8C is a second diagram for illustrating matching between the first user and the second user in the first embodiment.

Here, the matching processing unit F330 sets the combination between the first user and the second user allowed to ride in the identical vehicle 10 so that the destination point of the second user does not belong to a predetermined area (destination area) including the destination point of the first user. Note that as depicted in FIGS. 8B and 8C, the destination area in this example is an area having a distance that is from the destination point of the first user and is equal to or less than a predetermined distance r. Note that this embodiment has no intention of limitation thereto. The destination area may be in a town including the destination point, or in a predetermined administrative district including the destination point.

Accordingly, the second user C002 has the destination point d relatively near to the destination point e of the first user S001. Consequently, in this example, the destination point d of the second user C002 belongs to the destination area of the first user S001. The second user C001 has the destination point g relatively near to the destination point f of the first user S002. Consequently, in this example, the destination point g of the second user C001 belongs to the destination area of the first user S002. On the other hand, the second user C001 has the destination point g relatively far from the destination point e of the first user S001. Consequently, in this example, the destination point g of the second user C001 does not belong to the destination area of the first user S001. The second user C002 has the destination point d relatively far from the destination point f of the first user S002. Consequently, in this example, the destination point d of the second user C002 does not belong to the destination area of the first user S002.

In this case, the matching processing unit F330 matches the first user S001 with the second user C001. Accordingly, as depicted in FIG. 8B, while the first user S001 moves the vehicle 10 from the own departure point c to the own destination point e, this user allows the second user C001 to board the vehicle at the point c, and allows the second user C001 to get off the vehicle at the point g, thus moving the second user C001 from the departure point c of this second user to the destination point g of this second user.

The matching processing unit F330 matches the first user S002 with the second users C002 and C003. Accordingly, as depicted in FIG. 8C, while the first user S002 moves the vehicle 10 from the own departure point c to the own destination point f, this user allows the second users C002 and C003 to board the vehicle at the point c, and allows the second user C003 to get off the vehicle at the point h, thus moving the second user C003 from the departure point c of this second user to the destination point h of this second user, and allows the second user C002 to get off the vehicle at the point d, thus moving the second user C002 from the departure point c of this second user to the destination point d of this second user.

Note that the predetermined distance r is defined on the basis of the range of activity of the first user. As with this embodiment, when the destination point of the first user is the residence of the first user, the first user's range of activity from the destination point can be grasped as the first user's range of zone of life. In this case, the predetermined distance r is, for example, the radius (5 to 10 km) of the zone of life by bicycle. However, there is no intention of limitation thereto. The predetermined distance r may be, for example, the radius (2 to 5 km) of the zone of life by bicycle, or the radius (about 1 km) of the zone of life by foot.

For example, when the destination point of the first user is a predetermined commercial facility, the first user's range of activity from the destination point can be grasped as the range of the community to which the commercial facility belongs.

Accordingly, the destination point of the second user is outside of the range of activity of the first user. Accordingly, it is difficult for the first user to grasp detailed information related to the destination point of the second user. In this embodiment, the destination point of the second user is a predetermined point in a vicinity of the residence of the second user. Here, the predetermined point in the vicinity of the residence is, for example, a predetermined point within a range with a radius of 300 m from the residence (a parking lot allowing parking at a shop or in a facility, a place allowing parking along a highway, etc.). Consequently, the residence of the second user is not known to the first user. The situation where the residence of the second user is identified by the first user from the geographical information on the vicinity of the destination point of this second user can be prevented as much as possible. Note that there is no intention of limiting the destination point of the second user to a predetermined point in the vicinity of the residence of this second user. For example, the destination point of the second user may be the residence of this second user, or a predetermined commercial facility. In this case, the situation where information on the zone of life or the like of the second user is grasped by the first user can be avoided. As described above, the second user is facilitated to protect his/her own information.

After the matching processing unit F330 completes the matching between the first user and the second user, this unit generates the matching information and registers the information in the matching information database D330.

Here, the matching information database D330 is a database that stores the matching information. The matching information database D330 includes a matching information table depicted in FIG. 9. Note that information stored in the matching information table is not limited to the example depicted in FIG. 9. A field can be appropriately added, changed or removed.

The matching information table depicted in FIG. 9 includes the fields of the driver ID, the passenger ID, the vehicle number, the departure point, scheduled departure time, the passenger destination point, and the driver destination point. In this example, as described with reference to FIGS. 8B and 8C, the first user S001 is matched with the second user C001, and the first user S002 is matched with the second users C002 and C003.

Such matching information is provided by the matching information providing unit F340 depicted in FIG. 5 for the first user and the second user.

(Flow of Processes)

Figure 10:
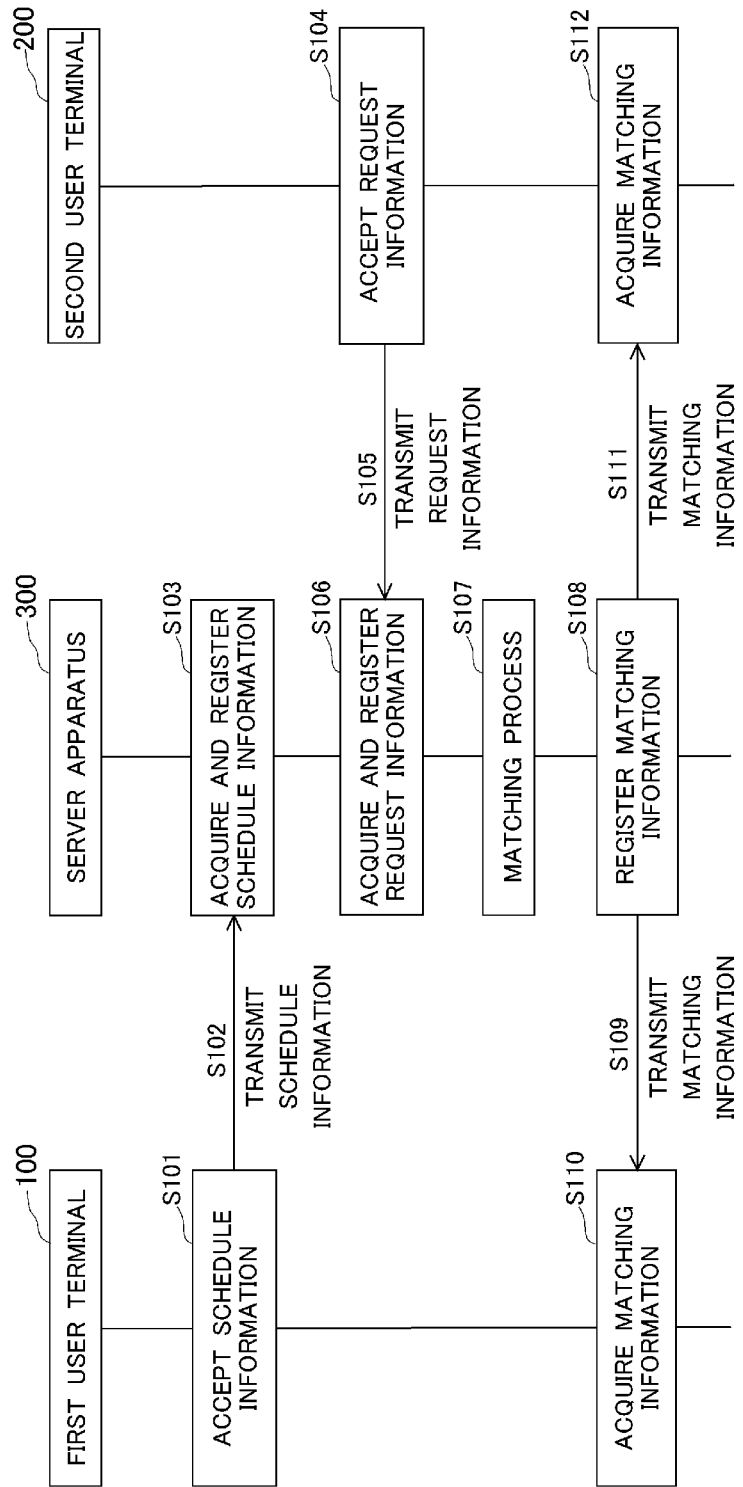
FIG. 10 is a diagram exemplifying a flow of an operation of the matching system according to the first embodiment.

The flow of operation of the matching system according to this embodiment is described. FIG. 10 is a diagram exemplifying the flow of operation of the matching system according to this embodiment. FIG. 10 illustrates the flow of operation between the components, and the process executed by each component, in the matching system 1.

The first user terminal 100 accepts the schedule information from the first user (S101), and transmits the information to the server apparatus 300 (S102).

The server apparatus 300 then acquires the schedule information transmitted from the first user terminal 100, through reception by the communication unit 304, and registers the schedule information in the schedule information database D310 (S103). Here, the schedule information includes the destination point of the first user. That is, the process of S103 is a step of acquiring the destination point of the first user.

The second user terminal 200 accepts the request information from the second user (S104), and transmits the information to the server apparatus 300 (S105).

The server apparatus 300 then acquires the request information transmitted from the second user terminal 200, through reception by the communication unit 304, and registers the request information in the request information database D320 (S106). Here, the request information includes the destination point of the second user. That is, the process of S106 is a step of acquiring the destination point of the second user.

The server apparatus 300 performs the matching process on the basis of the schedule information and the request information (S107). As described above, the matching processing unit F330 of the server apparatus 300 sets the combination between the first user and the second user allowed to ride in the identical vehicle 10 so that the destination point of the second user does not belong to the destination area of the first user. After completion of the matching process, the server apparatus 300 registers the matching information in the matching information database D330 (S108). Furthermore, the server apparatus 300 transmits the matching information registered in the matching information database D330 to the first user terminal 100 and the second user terminal 200 (S109 and S111).

The first user terminal 100 and the second user terminal 200 acquire the matching information transmitted from the server apparatus 300 (S110 and S112).

The matching system described above prevents a situation where the second user hesitates to use the rideshare, as much as possible, and facilitates the second user to use the rideshare. As described above, the information processing apparatus according to the present disclosure can set the combination beneficial for the users riding in the identical vehicle 10.

(Recording Medium)

A program that allows a computer, another machine or an apparatus (hereinafter a computer or the like) to achieve any of the functions described above can be recorded in a recording medium that is readable by the computer or the like. The computer or the like is caused to read and perform the program in the recording medium, thereby enabling the function to be provided.

Here, the recording medium that is readable by the computer or the like is a non-transitory recording medium that can accumulate information, such as data or programs, through an electric, a magnetic, an optical, a mechanical or a chemical action, and read it from the computer or the like. What is detachable from the computer or the like among such recording media includes, for example, a flexible disk, magnetooptical disk, CD-ROM, CD-R/W, DVD, blu-ray disk, DAT, 8 mm tape, and a memory card, such as a flash memory. Furthermore, there is a hard disk, ROM (read only memory) and the like as recording media fixed to the computer or the like. Moreover, an SSD (Solid State Drive) can be used as a recording medium detachable from the computer or the like and also as a recording medium fixed to the computer or the like.

Modification Example 1 of First Embodiment

Next, a modification example 1 of the aforementioned first embodiment is described. Note that in this modification example, detailed description of components and control processes substantially identical to those in the first embodiment is omitted.

In the aforementioned first embodiment, as described with reference to FIG. 3, the first user drives the vehicle 10, and allows the second user to ride in the vehicle 10. On the other hand, in this modification example, the drive user drives the vehicle 10 and allows the first user and the second user to ride in the vehicle 10. This is described based on FIGS. 11 to 14.

Figure 11:
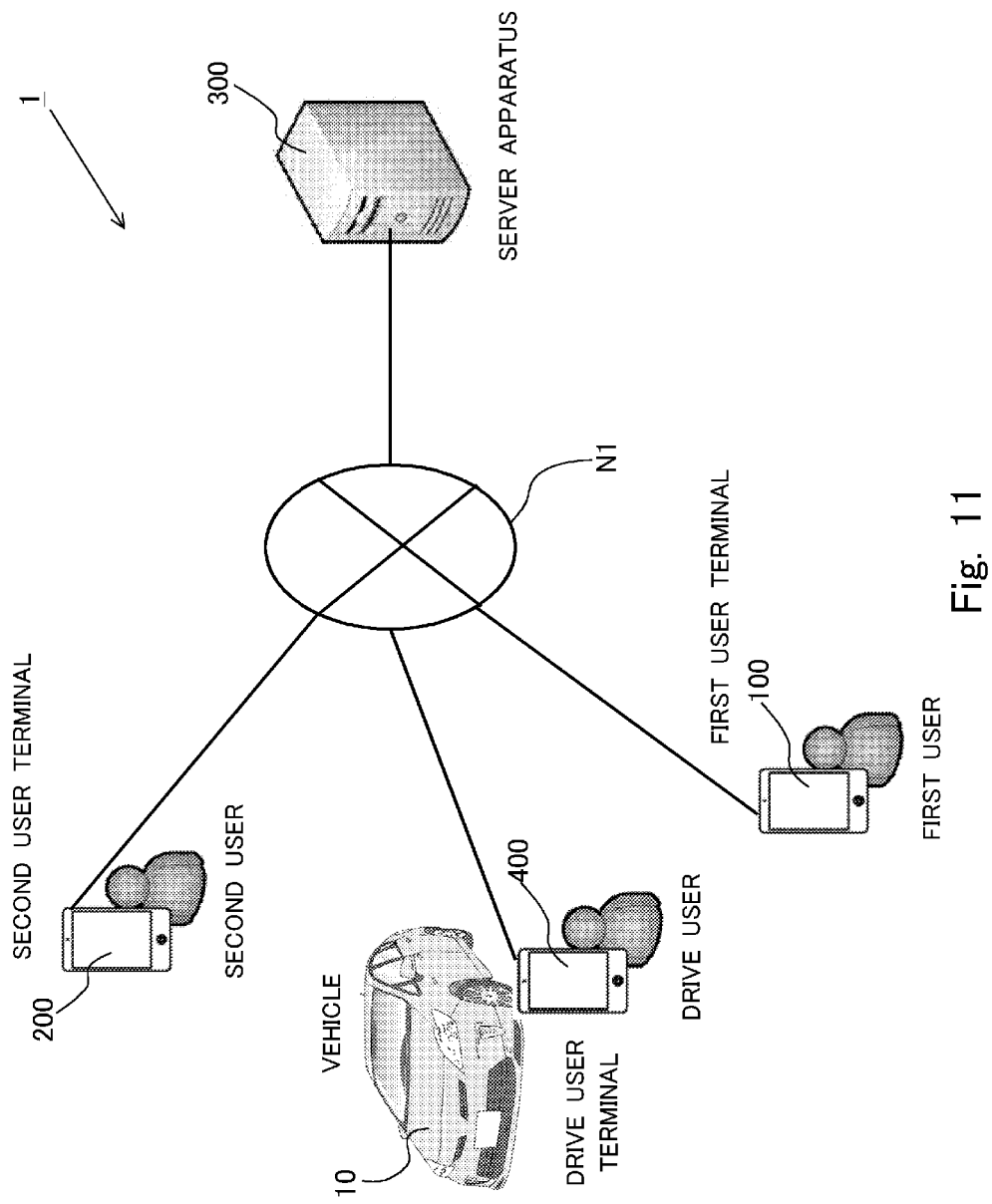
FIG. 11 is a diagram depicting the schematic configuration of a matching system according to a modification example 1 of the first embodiment.

FIG. 11 is a diagram depicting the schematic configuration of the matching system according to this modification example. In the example in FIG. 11, the matching system 1 includes: the vehicle 10; a drive user terminal 400 that is a terminal owned by the drive user driving the vehicle 10; a first user terminal 100 that is a terminal owned by the first user riding in the vehicle 10 that the drive user drives; a second user terminal 200 that is a terminal owned by the second user riding in the vehicle 10 that the drive user drives; and the server apparatus 300. The first user terminal 100, the second user terminal 200, the server apparatus 300, and the drive user terminal 400 are connected to each other by a network N1.

As described in the first embodiment, the first user and the second user are users who ride in the identical vehicle 10 and travel, and the second user gets off the vehicle 10 earlier than the first user does. In this modification example, the functional configuration of the first user terminal 100 is substantially identical to the functional configuration of the second user terminal 200. The functional configuration of the drive user terminal 400 is substantially identical to the functional configuration of the first user terminal 100 described in the first embodiment.

Figure 12:
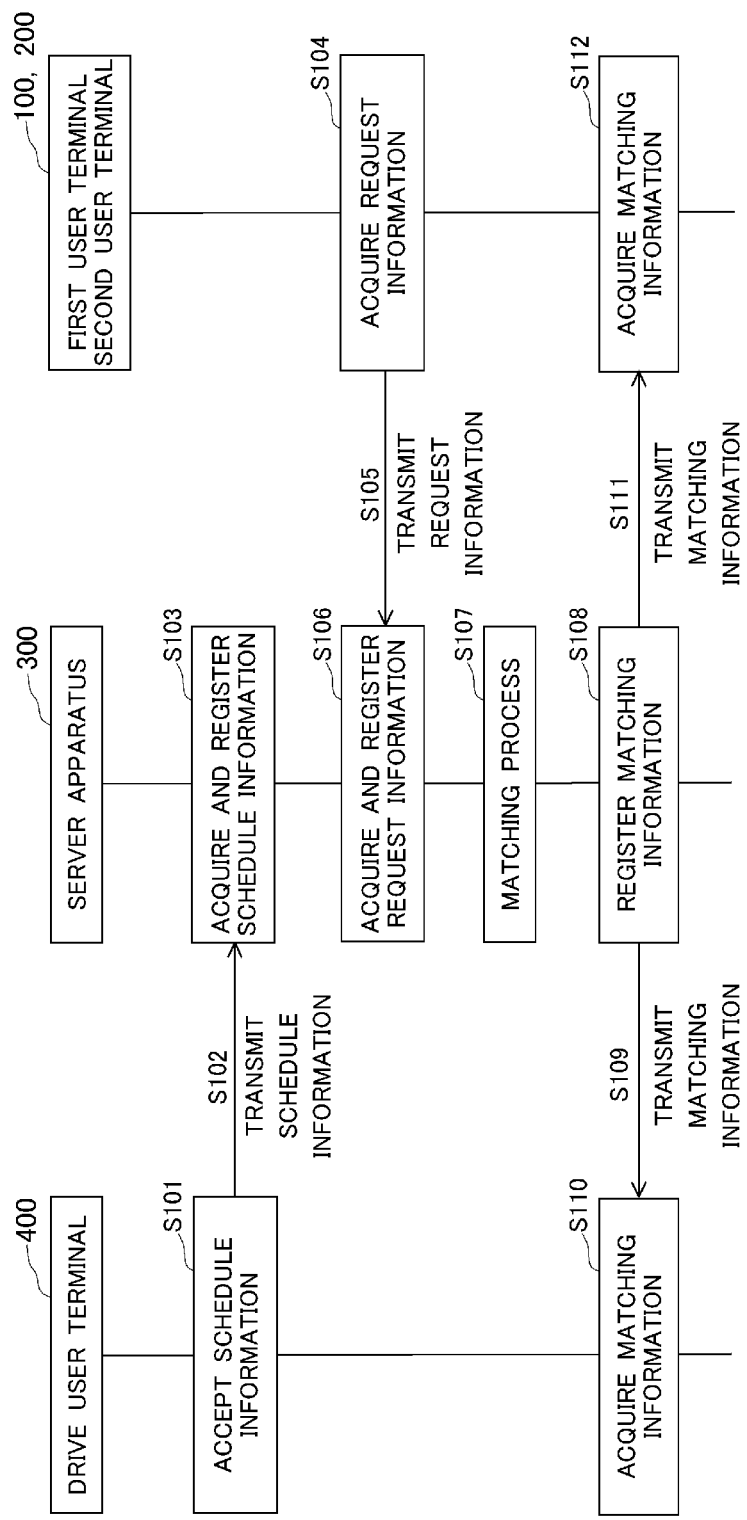
FIG. 12 is a diagram exemplifying a flow of an operation of the matching system according to the modification example 1 of the first embodiment.

FIG. 12 is a diagram exemplifying a flow of an operation of the matching system according to this modification example. In this modification example, the drive user terminal 400 accepts the schedule information from the drive user (S101), and transmits the information to the server apparatus 300 (S102). In an analogous manner where the second user terminal 200 accepts the request information from the second user (S104) and transmits the information to the server apparatus 300 (S105), the first user terminal 100 accepts the request information from the first user (S104) and transmits the information to the server apparatus 300 (S105).

The server apparatus 300 then performs the matching process on the basis of the request information (S107). As described above, the matching processing unit F330 of the server apparatus 300 sets the combination between the first user and the second user allowed to ride in the identical vehicle 10 so that the destination point of the second user does not belong to the destination area of the first user.

Here, FIG. 13 depicts the matching information table in this modification example. The passengers C001 and C002 depicted in FIG. 13 are the same as the passengers C001 and C002 depicted in FIG. 7 described above. In this modification example, the passenger C002 corresponds to the first user, and the passenger C001 corresponds to the second user. This is described based on FIG. 14.

Figure 14:
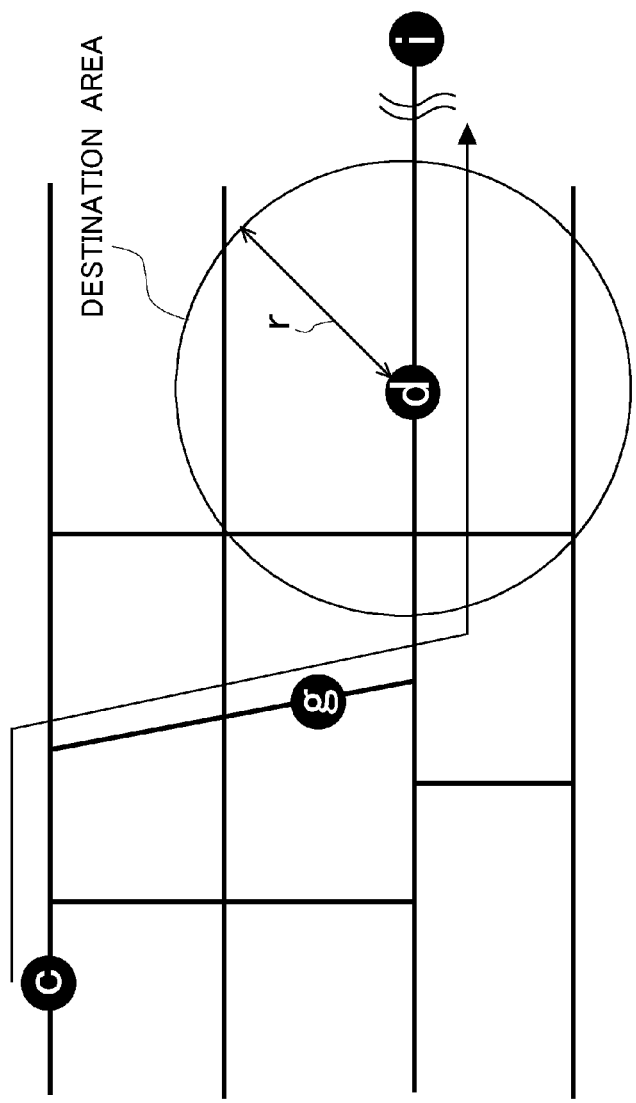
FIG. 14 illustrates matching between the first user and the second user in the modification example 1 of the first embodiment.

FIG. 14 illustrates matching between the first user and the second user in this modification example. In FIG. 14, while the drive user S003 moves the vehicle 10 from the own departure point c to the own destination point i, this user allows the first user C002 and the second user C001 to board the vehicle at the point c, and allows the second user C001 to get off the vehicle at the point g, thus moving the second user C001 from the departure point c of this second user to the destination point g of this second user, and allows the first user C002 to get off the vehicle at the point d, thus moving the first user C002 from the departure point c of this first user to the destination point d of this first user. Accordingly, the destination point of the second user is outside of the range of activity of the first user, and the second user is facilitated to protect the own information.

The matching system described above also can set the combination beneficial for the users riding in the identical vehicle 10.

Note that the aforementioned matching system depicted in FIG. 11 includes the drive user terminal 400, which is a terminal owned by the drive user driving the vehicle 10. However, there is no intention of limitation thereto. For example, the vehicle 10 may be an autonomous mobile body that autonomously moves on the basis of a predetermined operation instruction. In this case, there is no drive user. Accordingly, the server apparatus 300 acquires the drive schedule of the vehicle 10 (schedule information) from a predetermined operation management server.

Modification Example 2 of First Embodiment

Next, a modification example 2 of the aforementioned first embodiment is described. Note that in this modification example, detailed description of components and control processes substantially identical to those in the first embodiment is omitted.

As described in the first embodiment, the first user S001 driving the vehicle 10 moves the vehicle 10, with the own residence e being adopted as the destination point. Here, in a case where the departure point c of the vehicle 10 is the place of work of the first user S001, the first user S001 tends to move the vehicle 10 from the point c to the point e along a determined route. In this modification example, the server apparatus 300 stores the thus determined route, and matches the second user whose destination point does not belong to the route. This is described based on FIG. 15.

Figure 15:
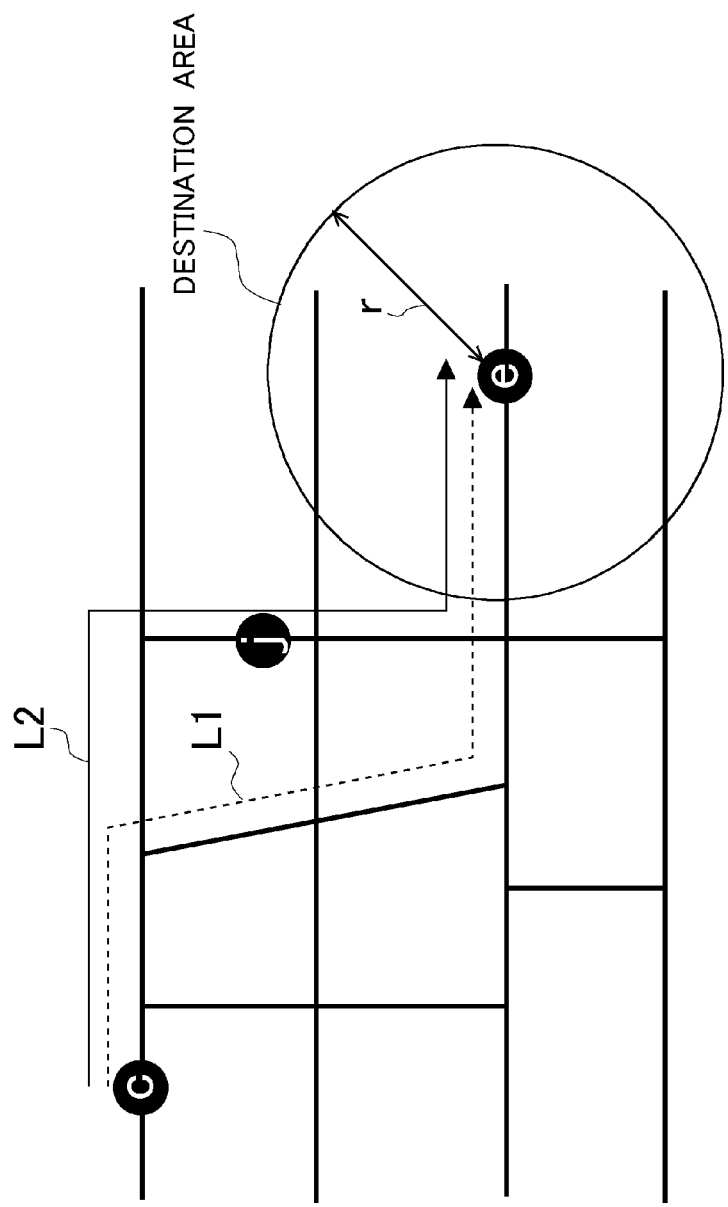
FIG. 15 illustrates matching between the first user and the second user in a modification example 2 of the first embodiment.

FIG. 15 illustrates matching between the first user and the second user in this modification example. In FIG. 15, typically, the first user S001 moves the vehicle 10 from the departure point c to the destination point e along the determined route L1. In this case, the first user S001 has sometimes much information (e.g., detailed geographical information) also around the route L1 besides the destination area. Consequently, if the destination point of the second user belongs to the route L1, inconvenience for the second user can occur.

As depicted in FIG. 15, in this modification example, the first user S001 is matched with the second user whose destination point is j. In this case, the first user S001 moves the vehicle 10 along a route L2, for example. Consequently, the first user S001 is difficult to grasp detailed information related to the destination point of the second user. As described above, the second user is facilitated to protect his/her own information. That is, such a matching system also can set the combination beneficial for the users riding in the identical vehicle 10.

Second Embodiment

Next, a second embodiment of the present disclosure is described. Note that in this embodiment, detailed description of components and control processes substantially identical to those in the aforementioned first embodiment is omitted.

In the first embodiment described above, the server apparatus 300 sets the combination between the first user and the second user allowed to ride in the identical vehicle 10 so that the destination point of the second user does not belong to the destination area that is a predetermined area including the destination point of the first user. On the other hand, in this embodiment, the server apparatus 300 sets the combination between the first user and the second user allowed to ride in the identical vehicle 10 so that the departure point of the second user does not belong to the departure area that is a predetermined area including the departure point of the first user. This is described based on FIGS. 16A to 16C.

Figure 16A:
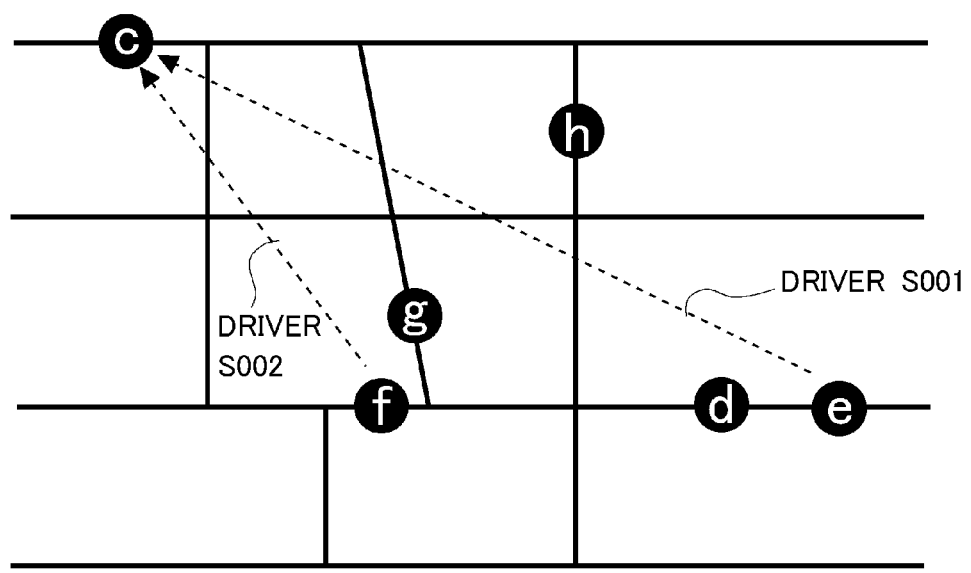
FIG. 16A exemplifies the departure points and the destination points of the first user and the second user according to a second embodiment.
Figure 16B:
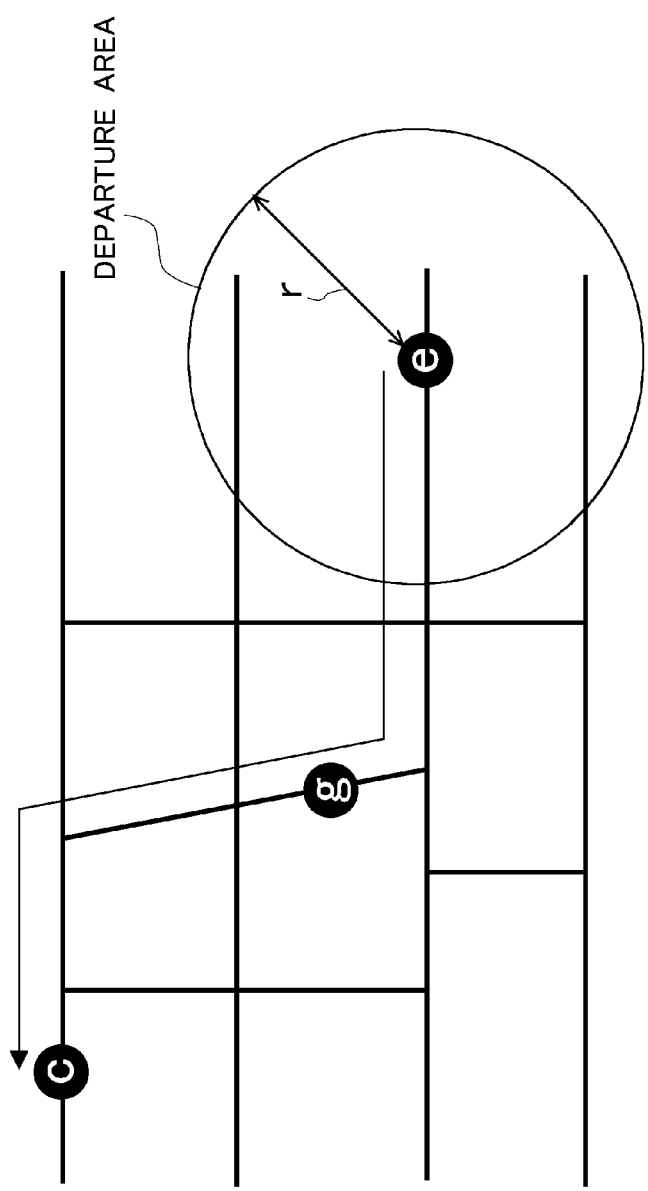
FIG. 16B is a first diagram for illustrating matching between the first user and the second user in the second embodiment.
Figure 16C:
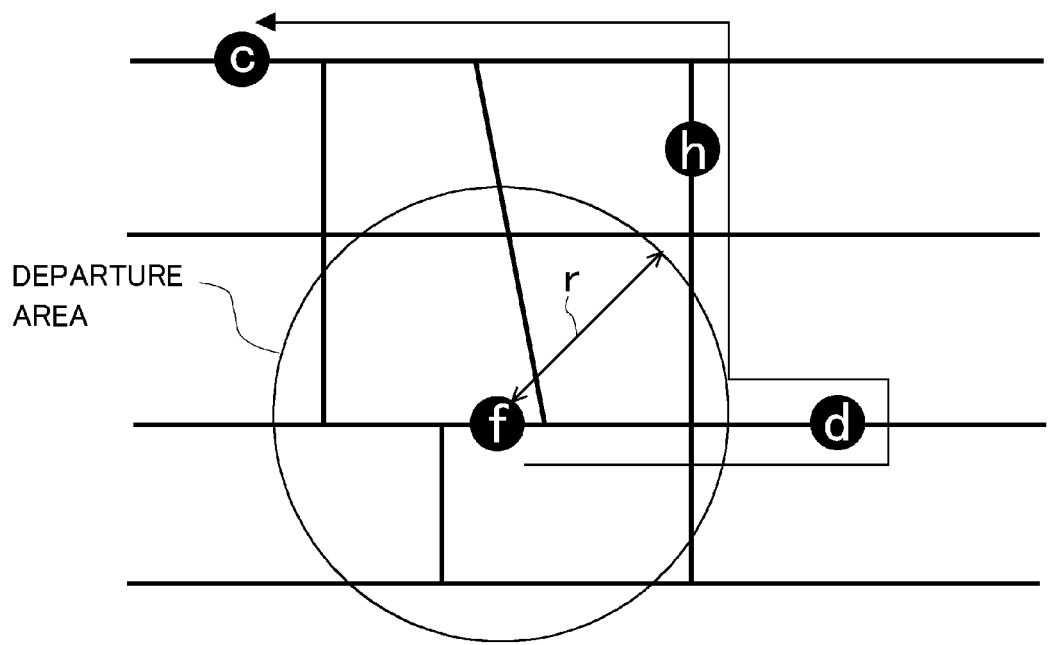
FIG. 16C is a second diagram for illustrating matching between the first user and the second user in the second embodiment.

FIG. 16A exemplifies the departure points and the destination points of the first user and the second user. In FIG. 16A, the first user S001 serving as a driver moves the vehicle 10 from the departure point e to the destination point c. The first user S002 serving as a driver moves the vehicle 10 from the departure point f to the destination point c. The departure points of the second users riding in the vehicle 10 are d, g and h. In detail, the departure point of the second user C001 is g, the departure point of the second user C002 is d, and the departure point of the second user C003 is h. Note that the destination point of these second users is c, as with the destination point of the first users. As depicted in FIGS. 16B and 16C, the departure area in this example is an area having a distance that is from the departure point of the first user and is equal to or less than the predetermined distance r. Note that this embodiment has no intention of limitation thereto. The departure area may be in a town including the departure point, or in a predetermined administrative district including the departure point.

Accordingly, the second user C002 has the departure point d relatively near to the departure point e of the first user S001. Consequently, in this example, the departure point d of the second user C002 belongs to the departure area of the first user S001. The second user C001 has the departure point g relatively near to the departure point f of the first user S002. Consequently, in this example, the departure point g of the second user C001 belongs to the departure area of the first user S002. On the other hand, the second user C001 has the departure point g relatively far from the departure point e of the first user S001. Consequently, in this example, the departure point g of the second user C001 does not belong to the departure area of the first user S001. The second user C002 has the departure point d relatively far from the departure point f of the first user S002. Consequently, in this example, the departure point d of the second user C002 does not belong to the departure area of the first user S002.

In this case, the matching processing unit F330 matches the first user S001 with the second user C001. Accordingly, as depicted in FIG. 16B, while the first user S001 moves the vehicle 10 from the own departure point e to the own destination point c, this user allows the second user C001 to board the vehicle at the point g, and allows the second user C001 to get off the vehicle at the point c, thus moving the second user C001 from the departure point g of this second user to the destination point c of this second user.

The matching processing unit F330 matches the first user S002 with the second users C002 and C003. Accordingly, as depicted in FIG. 16C, while the first user S002 moves the vehicle 10 from the own departure point f to the own destination point c, this user allows the second user C002 to board the vehicle at the point d, allows the second user C003 to board the vehicle at the point h, and allows the second users C002 and C003 to get off the vehicle at the point c.

In this embodiment, in the flow of the operation depicted in FIG. 10 described above, the departure point of the first user is acquired in the process of S103, and the departure point of the second user is acquired in the process of S106. In the process of S107, the combination between the first user and the second user allowed to ride in the identical vehicle 10 so that the departure point of the second user does not belong to the departure area of the first user.

Accordingly, the departure point of the second user is outside of the range of activity of the first user. Accordingly, it is difficult for the first user to grasp detailed information related to the departure point of the second user. Consequently, the second user is facilitated to protect his/her own information.

If the second user can grasp the position information on the vehicle 10 where this user is scheduled to board, before boarding the vehicle 10, and the first user and the second user having relatively near departure points are matched with each other, information on the first user's zone of life and the like is grasped by the second user.

On the contrary, in this embodiment, the departure point of the second user is outside of the departure area of the first user. That is, the departure point of the first user and the departure point of the second user are relatively far from each other. Consequently, it is difficult for the second user to grasp the detailed information related to the departure point of the first user.

The matching system described above prevents a situation where the second user hesitates to use the rideshare, as much as possible, and facilitates the second user to use the rideshare. As described above, the information processing apparatus according to the present disclosure can set the combination beneficial for the users riding in the identical vehicle 10.

Note that in FIGS. 16A to 16C, both of the destination point of the first user and the destination point of the second user are the point c. In FIGS. 16A to 16C, the destination point of the first user and the destination point of the second user may, however, be different from each other. In this case, as described in the first embodiment, the matching processing unit F330 may set the combination between the first user and the second user allowed to ride in the identical vehicle 10 so that the destination point of the second user does not belong to the destination area of the first user.

Third Embodiment

Next, a third embodiment of the present disclosure is described. Note that in this embodiment, detailed description of components and control processes substantially identical to those in the aforementioned first embodiment is omitted.

In the first embodiment described above, the server apparatus 300 sets the combination between the first user and the second user allowed to ride in the identical vehicle 10 so that the destination point of the second user does not belong to the destination area of the first user. Accordingly, the destination point of the second user is outside of the range of activity of the first user, and the second user is facilitated to protect the own information. However, if the first user repetitively drives in a predetermined area (the driving includes not only a case where the first user serves as a driver of the vehicle 10 and drives but also a case where the first user serves as a passenger of the vehicle 10 for the driving), the first user can have much information (e.g., detailed geographical information) on the predetermined area even with the predetermined area being outside of the range of activity of the first user. If the destination point of the second user is included in the predetermined area, a situation can occur where the second user is afraid that the second user's information (e.g., the zone of life) is known to the first user.

In this embodiment, the server apparatus 300 sets the combination between the first user and the second user allowed to ride in the identical vehicle 10 so as not to repeat the combination between the first user and the second user having previously ridden in the identical vehicle 10. This is hereinafter described.

As described for the flow of the operation depicted in FIG. 10, the server apparatus 300 registers the matching information in the matching information database D330 (S108). In this embodiment, the aforementioned combination information between the first user and the second user as depicted in FIG. 9 is accumulated and stored in the auxiliary memory unit 303 of the server apparatus 300. That is, the server apparatus 300 stores the combination between the first user and the second user having previously ridden in the identical vehicle 10.

In this embodiment, when the matching processing unit F330 matches the first user with the second user, the matching processing unit F330 sets the combination between the first user and the second user allowed to ride in the identical vehicle 10 so that the destination point of the second user does not belong to the destination area of the first user, and sets the combination between the first user and the second user allowed to ride in the identical vehicle 10 so as not to repeat the combination between the first user and the second user having previously ridden in the identical vehicle 10.

Accordingly, it is difficult for the first user to grasp detailed information related to the destination point of the second user. In other words, the second user is facilitated to protect his/her own information. Accordingly, the second user is facilitated to use the rideshare. As described above, also according to this embodiment, the combination beneficial for the users riding in the identical vehicle 10 can be set.

Other Embodiments

The embodiments described above are only examples. The present disclosure can be appropriately changed and executed in a scope without departing from the gist.

The matching system according to this embodiment is not limited to the application to rideshare as described above and, for example, may be used for a case of matching a taxi driver with a customer.

The processes and means described in this disclosure can be freely combined and executed unless a technical contradiction occurs.

The process described as what is performed by a single device may be shared among multiple devices and executed. Alternatively, the processes described as what is performed by different devices may be executed by a single device. In a computer system, a hardware configuration (server configuration) that executes each function can be flexibly changed.

The present disclosure can be also achieved by providing a computer with a computer program where the functions described in the embodiments are implemented, and by causing one or more processors included in the computer to read and execute the program. Such a computer program may be provided for the computer through a non-transitory computer readable storage medium connectable to a system bus of the computer, or provided for the computer via a network. The non-transitory computer readable storage medium may be, for example, any type of disk, such as a magnetic disk (floppy (R) disk, hard disk drive (HDD), etc.) or an optical disk (CD-ROM, DVD disk, blu-ray disk, etc.), or a read only memory (ROM), a random access memory (RAM), EPROM, EEPROM, a magnetic card, a flash memory or an optical card, or any type of medium suitable for storing electronic instructions.

What is claimed is:

1. An information processing apparatus applied to a traffic mode where a plurality of users including a first user and a second user ride in an identical vehicle and travel, and the second user gets off the identical vehicle earlier than the first user does, comprising a controller configured to execute:
    acquiring destination points of the first user and the second user in the traffic mode;
    setting a predetermined area including the destination point of the first user and an area proximate to the destination point of the first user;
    determining whether the destination point of the second user is within or outside the predetermined area;
    upon determining that the destination point of the second user is outside the predetermined area, setting a combination between the first user and the second user so that the first user and the second user are allowed to ride in the identical vehicle; and
    upon determining that the destination point of the second user is within the predetermined area, not setting the combination between the first user and the second user so that the first user and the second user are not allowed to ride in the identical vehicle.

2. The information processing apparatus according to claim 1,
    wherein the predetermined area is an area within a predetermined distance from the destination point of the first user.

3. The information processing apparatus according to claim 1,
    wherein the destination point of the second user is a predetermined point in a vicinity of a residence of the second user.

4. The information processing apparatus according to claim 1,
    wherein in the traffic mode, the second user boards the identical vehicle after the first user does, and gets off the identical vehicle earlier than the first user does, and the controller executes:
        further acquiring departure points of the first user and the second user in the traffic mode;
        setting another predetermined area including the departure point of the first user and an area proximate to the departure point of the first user;
        determining whether the departure point of the second user is within or outside the another predetermined area;
        upon determining that the departure point of the second user is outside the another predetermined area, setting the combination between the first user and the second user so that the first user and the second user are allowed to ride in the identical vehicle; and
        upon determining that the departure point of the second user is within the another predetermined area, not setting the combination between the first user and the second user so that the first user and the second user are not allowed to ride in the identical vehicle.

5. The information processing apparatus according to claim 1,
    wherein the controller sets the combination between the first user and the second user who are allowed to ride in the identical vehicle so as not to repeat the combination between the first user and the second user having previously ridden in the identical vehicle.

6. An information processing apparatus applied to a traffic mode where a plurality of users including a first user and a second user ride in an identical vehicle and travel, and the second user boards the identical vehicle after the first user does, comprising a controller configured to execute:
    acquiring departure points of the first user and the second user in the traffic mode;
    setting a predetermined area including the departure point of the first user and an area proximate to the departure point of the first user;
    determining whether the departure point of the second user is within or outside the predetermined area;
    upon determining that the departure point of the second user is outside the predetermined area, setting a combination between the first user and the second user so that the first user and the second user are allowed to ride in the identical vehicle; and
    upon determining that the departure point of the second user is within the predetermined area, not setting the combination between the first user and the second user so that the first user and the second user are not allowed to ride in the identical vehicle.

7. The information processing apparatus according to claim 6, wherein the predetermined area is an area having a distance that is equal to or less than a predetermined distance from the departure point of the first user.

8. The information processing apparatus according to claim 6,
wherein the departure point of the second user is a predetermined point in a vicinity of a residence of the second user.

9. The information processing apparatus according to claim 6,
wherein the controller sets the combination between the first user and the second user who are allowed to ride in the identical vehicle so as not to repeat the combination between the first user and the second user having previously ridden in the identical vehicle.

10. An information processing method applied to a traffic mode where a plurality of users including a first user and a second user ride in an identical vehicle and travel, and the second user gets off the identical vehicle earlier than the first user does, the information processing method causing a computer to execute:
a step of acquiring destination points of the first user and the second user in the traffic mode;
a step of setting a predetermined area including the destination point of the first user and an area proximate to the destination point of the first user;
a step of determining whether the destination point of the second user is within or outside the predetermined area;
a step of, upon determining that the destination point of the second user is outside the predetermined area, setting a combination between the first user and the second user so that the first user and the second user are allowed to ride in the identical vehicle; and
a step of, upon determining that the destination point of the second user is within the predetermined area, not setting the combination between the first user and the second user so that the first user and the second user are not allowed to ride in the identical vehicle.

11. A non-transitory memory medium stored with a program for causing a computer to execute the information processing method according to claim 10.

12. An information processing method applied to a traffic mode where a plurality of users including a first user and a second user ride in an identical vehicle and travel, and the second user boards the identical vehicle after the first user does, the information processing method causing a computer to execute:
a step of acquiring departure points of the first user and the second user in the traffic mode;
a step of setting a predetermined area including the departure point of the first user and an area proximate to the departure point of the first user;
a step of determining whether the departure point of the second user is within or outside the predetermined area;
a step of, upon determining that the departure point of the second user is outside the predetermined area, setting a combination between the first user and the second user so that the first user and the second user are allowed to ride in the identical vehicle; and
a step of, upon determining that the departure point of the second user is within the predetermined area, not setting the combination between the first user and the second user so that the first user and the second user are not allowed to ride in the identical vehicle.

13. A non-transitory memory medium storing a program for causing a computer to execute the information processing method according to claim 12.

* * * * *